June 7, 1927.   A. N. CALKINS   1,631,243
TRACTOR
Original Filed March 25, 1925    2 Sheets-Sheet 2
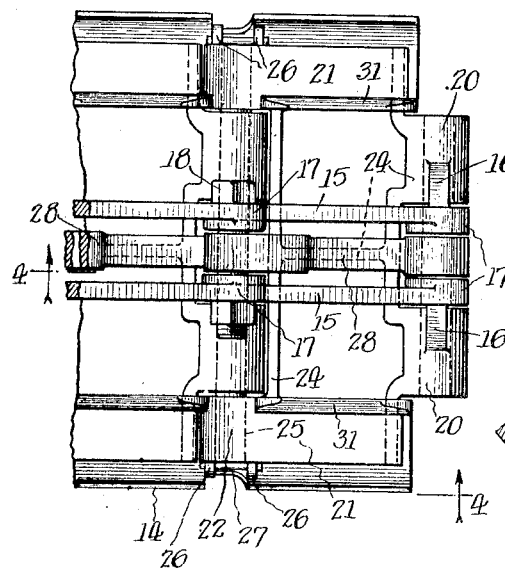
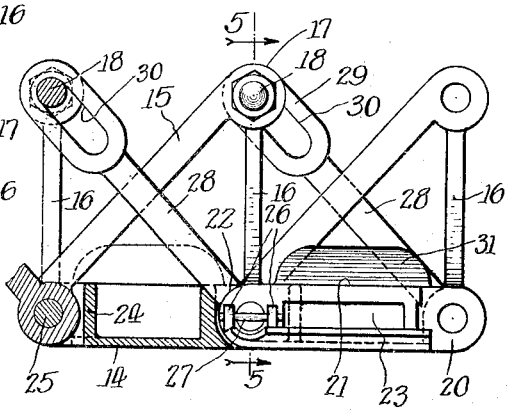
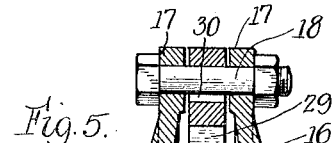
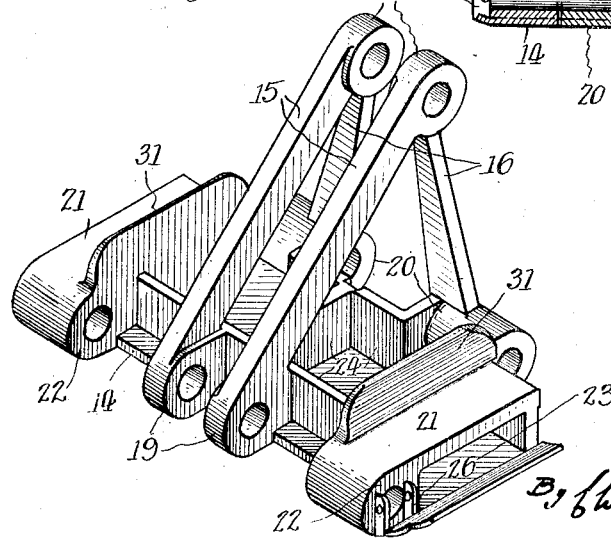
Inventor:
A. N. Calkins,
Attys.

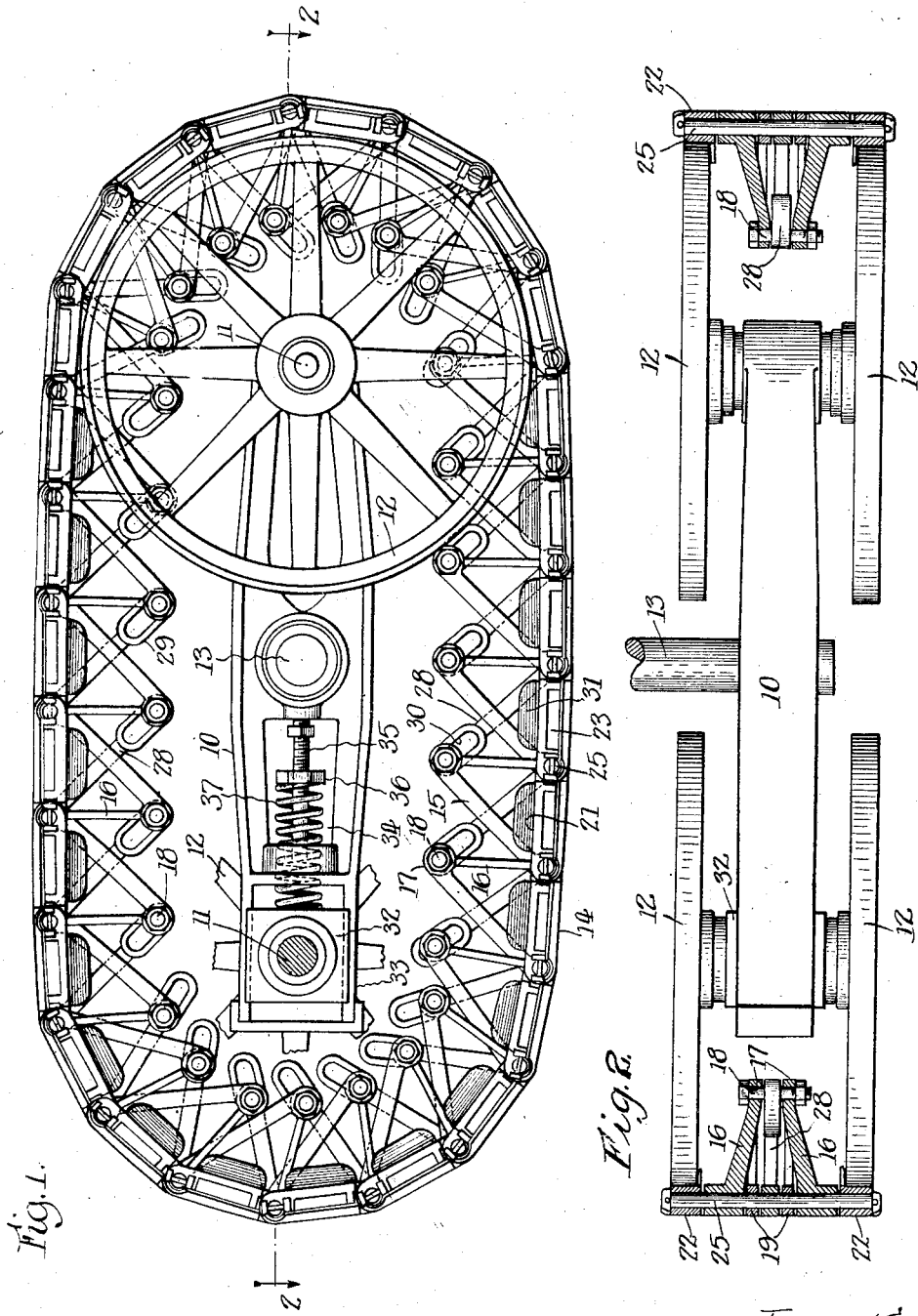

Patented June 7, 1927.

1,631,243

UNITED STATES PATENT OFFICE.

ADDISON N. CALKINS, OF QUINCY, ILLINOIS, ASSIGNOR TO ELECTRIC WHEEL COMPANY, OF QUINCY, ILLINOIS, A CORPORATION OF ILLINOIS.

TRACTOR.

Application filed March 25, 1925, Serial No. 18,089. Renewed April 1, 1926.

The invention pertains to tractors having an endless chain consisting of a series of separate link sections pivotally connected together so as to travel around spaced rotary supporting members and coacting to restrain flexing in an upward direction as the chain travels over the ground but permitting a bending or flexing of the chain around the supporting members.

The object of the invention generally stated is to produce a chain for a tractor of the character referred to, in which the link sections are operatively connected together in a novel and advantageous manner to produce between adjacent links a truss action preventing flexing of the chain upwardly as it passes over the ground, but permitting relative pivotal movement between the sections for passage around the supporting members.

In attaining the object thus set forth I provide separate sections adapted to be operatively connected by links or bars in a manner such that a truss is formed between each pair of adjacent sections. The horizontal or tie portion is formed by two adjacent tread portions and the inclined side portions are formed by an inclined arm on one section and the connecting bar between the two sections, the apex of the truss being disposed directly above the joint between the two tread portions. The aim is to simplify the construction of the chain while imparting strength and durability thereto.

In the accompanying drawings Figure 1 is a fragmentary side elevation section of a tractor illustrating my invention in its preferred form.

Fig. 2 is a fragmentary horizontal section taken approximately in the plane of line 2—2 of Fig. 1.

Fig. 3 is a fragmentary plan view showing two link sections connected together.

Fig. 4 is a fragmentary vertical sectional view taken approximately in the plane of line 4—4 of Fig. 3.

Fig. 5 is a transverse sectional view taken in the plane of line 5—5 of Fig. 4.

Fig. 6 is a perspective view of one of the link sections.

While the invention is illustrated in its preferred form it is contemplated that various changes in the construction and arrangement illustrated and hereinafter described may be made by those skilled in the are without departing from the spirit and scope of the invention as expressed in the appended claims.

The tractor comprises generally a central frame member 10 elongated in form and providing bearings at opposite ends in which are journaled the axles 11 of two pairs of rotary supporting members or wheels 12. The frame member is mounted substantially midway between its ends to turn on a shaft 13 upon which the tractor frame proper may by supported in the usual way.

The endless belt or chain is composed of a plurality of similar sections, each comprising a tread portion or shoe 14 generally rectangular in form and of substantial width. Extending inwardly from this shoe is a frame structure preferably formed integral with the shoe and comprising two pairs of arms 15 and 16 terminating at their inner ends in a pair of laterally spaced bearings 17 adapted to support a pivot bolt 18 a substantial distance inwardly of the shoe and approximately in the plane of the rear edge of the shoe. The outer ends of the arms 15 are respectively formed integral with a pair of laterally spaced bearings 19 at the forward edge of the shoe 14 from which they extend inwardly and rearwardly in substantially parallel relation for connection with the bearings 17. The outer ends of the arms 16 are formed integral with a pair of laterally spaced bearings 20 at the rear edge of the shoe, from which they extend inwardly while converging slightly for connection at their inner ends with the bearings 17.

At opposite sides of the shoe are formed track portions 21, the forward ends of which are constructed to provide bearings 22 alined with the bearings 19, these track portions being preferably cored out as indicated at 23 (Fig. 6) to lessen the weight of the section. Suitable reinforcing ribs 24 may be provided on the inner face of the shoe 14 as indicated clearly in Figure 6.

The arrangement of the parts is such that the laterally spaced bearings 20 at the rear or trailing edge of the shoe are adapted to enter between the bearings 22 in the forward edge of the next adjacent shoe and the intermediate bearings 19 thereof. A pivot pin 25 passing through the alined bearings 22 and 19 serves to connect the tread portions of adjacent link sections pivotally together. To hold the pivot pin 25 in place each of the bearings 22 has formed at its outer end a pair of lugs 26 disposed on opposite sides of the bearing aperture, which lugs are apertured to receive a retaining pin 27.

In addition to the pivotal connection thus provided between tread portions of the link sections there is provided a connecting bar 28 having one end pivotally mounted on the pivot bolt 18 of one section and its other end pivotally mounted on the pivot pin 25 of the next or rearwardly adjacent section. Thus the bar is, like the arms 15, angularly disposed with respect to the tread portions of the link sections, and occupies normally an approximately perpendicular relation to the arms 15. The outer end of the bar is entered between the spaced bearings 19 at the forward edge of one section and its inner end is entered between the bearings 17 of the frame structure of the forwardly adjacent section. At said inner end the member 28 has an elongated head 29 with a slot 30 therein for receiving the pivot bolt 18.

It will be seen that the arms 15 and the bar 28 of the two adjacent link sections form the inclined sides of a truss of which the horizontal connecting portion is formed by the two tread portions of said sections. The construction possesses great strength, effectually resisting upwardly directed forces as the chain passes over the ground, producing in effect a rigid tread of substantial length. On the other hand it permits the link sections to flex readily in the opposite direction for passage around rotary supporting members, the movement of the inner ends of the connecting bars 28 relative to the pivot bolt 18, in this operation, presenting no difficulties from the standpoint of interference between adjacent link sections.

To guide the link sections around the rotary supporting members 12 the track portions 21 of each section are provided with inwardly extending flanges 31 at the inner edges of the track portions; and to cause the link sections to adhere snugly to the peripheries of the supporting members as they pass around them, means is provided operating to maintain the chain under tension. Thus the axle 11 for one pair of supporting members 12 is mounted in a movable bearing 32 slidable in a bearing box 33 (Fig. 1) at one end of the frame member 10. The latter has an opening 34 therein at one end of which is mounted a screw 35 having an adjusting nut 36 thereon between which and the bearing 32 is interposed a coiled spring 37, the latter passing through a suitable opening in one side of the bearing box. This construction, while operating to maintain the chain taut serves to reduce noise produced by the links passing around the supporting members and also prevents injury to the parts by permitting one of the bearing members to yield relative to the other in the event that a stone or other substance should find its way between the supporting members and the chain.

I claim as my invention:

1. A tractor of the character described having an endless chain composed of a series of link sections each including a tread portion, means pivotally connecting adjacent tread portions together, an inwardly extending frame structure rigid with each tread portion and having a pivot bearing mounted therein substantially in the vertical plane containing one edge of the tread portion, and a member connecting said pivot bearing and the corresponding edge of the adjacent tread portion adapted to permit relative pivotal movement between the sections in one direction and to prevent relative pivotal movement in the opposite direction.

2. A tractor of the character described comprising an endless chain having a series of link sections each including a tread portion, means pivotally connecting adjacent tread portions together, an inwardly extending frame structure rigid with each tread portion and having a pivot bearing mounted therein substantially in the vertical plane containing one edge of the tread portion, and a member connecting said pivot bearing and the corresponding edge of the adjacent tread portion adapted to permit relative pivotal movement between the sections in one direction and to prevent relative pivotal movement in the opposite direction, said frame structure including a rigid arm arranged approximately perpendicular to said member.

3. A tractor of the character described comprising an endless chain having a series of link sections each including a tread portion, means pivotally connecting adjacent tread portions together, an inwardly extending frame structure rigid with each tread portion and having a pivot bearing mounted therein substantially in the vertical plane containing one edge of the tread portion, a member connecting said pivot bearing and the corresponding edge of the adjacent tread portion adapted to permit relative pivotal movement between the sections in one direction and to prevent relative pivotal movement in the opposite direction, said frame structure including a rigid arm arranged approximately perpendicular to said member, and a second arm between the inner end of the first arm and the tread portion.

4. A tractor comprising an endless chain composed of a series of link sections each comprising a tread portion and each having an inwardly extending frame structure comprising a pair of arms projecting approximately perpendicularly from one edge of the tread portion, a pair of inclined arms projecting from the opposite edge of said section, said two pairs of arms terminating to provide a bearing spaced inwardly from one edge of the tread portion, a pivot pin carried by said bearing, pivots connecting the tread portions of adjacent sections, and an inclined member connecting said pivot pin with the remote edge of the tread portion of the adjacent section, so as to permit relative movement between the adjacent sections in one direction only.

5. A tractor of the character described having an endless chain composed of a series of link sections each comprising a tread portion, interfitting bearings at adjacent edges of the tread portions of adjoining sections, pivots mounted in said interfitting bearings and serving pivotally to connect adjacent tread portions together, a plurality of arms projecting inwardly from said tread portions, a pivot supported by said arms in inwardly spaced relation to one edge of each tread portion, and a connecting member having an elongated opening in one end adapted to receive the pivot on said arms, the other end of said member being mounted on the pivot connecting the tread portions of the next two adjoining sections.

6. In a tractor of the character described, an endless chain composed of a series of link sections each comprising a tread portion, means pivotally connecting said tread portions together in edge to edge relation, and means additionally connecting each two adjacent link sections comprising a pair of members normally disposed substantially perpendicularly relative to each other, one of said members being rigid with one of said pair of tread portions and the other one of said members being pivoted to the other tread portion and having a pivotal and sliding connection with said rigid member.

7. In a tractor of the character described, an endless chain composed of a series of link sections each comprising a tread portion, means pivotally connecting said tread portions together in edge to edge relation, and means additionally connecting each two adjacent link sections comprising a pair of members normally disposed substantially perpendicularly relative to each other, one of said members being rigid with one of said pair of tread portions and the other one of said members being pivoted to the other tread portion and having a pivotal and sliding connection with said rigid member, each section also including an upright member between the inner end of the rigid member and the tread portion.

In testimony whereof, I have hereunto affixed my signature.

ADDISON N. CALKINS.